(12) United States Patent
Lee et al.

(10) Patent No.: US 12,314,843 B2
(45) Date of Patent: May 27, 2025

(54) NEURAL NETWORK OPERATION METHOD AND APPARATUS WITH MAPPING ORDERS

(71) Applicants: SAMSUNG ELECTRONICS CO., LTD., Suwon-si (KR); UNIST(ULSAN NATIONAL INSTITUTE OF SCIENCE AND TECHNOLOGY), Ulsan (KR)

(72) Inventors: Sehwan Lee, Seongnam-si (KR); Jongeun Lee, Ulsan (KR); Jooyeon Choi, Ulsan (KR)

(73) Assignees: SAMSUNG ELECTRONICS CO., LTD., Suwon-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 910 days.

(21) Appl. No.: 17/369,036

(22) Filed: Jul. 7, 2021

(65) Prior Publication Data
US 2022/0269930 A1    Aug. 25, 2022

(30) Foreign Application Priority Data
Feb. 25, 2021  (KR) .................. 10-2021-0025252

(51) Int. Cl.
| G06N 3/063 | (2023.01) |
| G06F 7/76  | (2006.01) |
| G06F 7/78  | (2006.01) |
| G06F 17/15 | (2006.01) |
| G06F 17/16 | (2006.01) |

(52) U.S. Cl.
CPC ............. *G06N 3/063* (2013.01); *G06F 17/15* (2013.01); *G06F 17/16* (2013.01); *G06F 7/762* (2013.01); *G06F 7/78* (2013.01)

(58) Field of Classification Search
CPC ........... G06F 17/15; G06F 17/16; G06F 7/762
See application file for complete search history.

(56) References Cited

U.S. PATENT DOCUMENTS

| 10,360,470 | B2  |   7/2019 | Yang et al.    |            |
| 2016/0358069 | A1 | 12/2016 | Brothers et al. |           |
| 2018/0129935 | A1* |  5/2018 | Kim ............... | G06F 17/153 |
| 2020/0026992 | A1* |  1/2020 | Zhang .............. | G06N 3/084 |

(Continued)

FOREIGN PATENT DOCUMENTS

| CN | 110705701 A   | 1/2020 |
| KR | 10-2023095 B1 | 9/2019 |

OTHER PUBLICATIONS

Guoqing Li, et al., "PSDNet and DPDNet: Efficient Channel Expansion, Depthwise-Pointwise-Depthwise Inverted Bottleneck Block" (15 pages in English).

(Continued)

*Primary Examiner* — Michael D. Yaary
(74) *Attorney, Agent, or Firm* — NSIP Law

(57) ABSTRACT

A neural network operation apparatus includes an input register to store an input feature map, a processing element array including a processing element to perform an operation based on the input feature map and a weight matrix, and a controller to map a portion of the input feature map and a portion of the weight matrix, both on which the operation is to be performed, to the processing element.

18 Claims, 19 Drawing Sheets

(56) References Cited

U.S. PATENT DOCUMENTS

2020/0167405 A1 5/2020 Suk et al.
2022/0129519 A1* 4/2022 Zheng ..................... G06F 17/16

OTHER PUBLICATIONS

Dongyi Kim, et al., "An Efficient Three-Dimensional Convolutional Neural Network for Inferring Physical Interaction Force from Video", Aug. 17, 2019 (21 pages in English).
Korean Office Action Issued on Mar. 27, 2025, in Counterpart Korean Patent Application No. 10-2021-0025252 (2 Pages in English, 5 Pages in Korean).

* cited by examiner

```
for (h=0; h<H_out; h++)
  for (w=0; w<W_out; w++)
    for (c=0; c<C; c++)
      for (k_h=0; k_h<K; k_h++)                    ⟵ Portion computed in one cycle
        for (k_w=0; k_w<K; k_w++)
          OFM[c,h,w] += W[c,k_h,k_w] × IFM[c,h+k_h,w+k_w];
```

FIG. 4

```
for (h'=0; h'<H_out; h'+=T_H)
 for (w'=0; w'<W_out; w'+=T_W)
  for (m'=0; m'<M; m'+=T_M)
   for (c'=0; c'<C; c'+=T_C)
    for (m=m'; m<T_M; m++)
     for (h=h'; h<T_H; h++)
      for (w=w'; w<T_W; w++)
       for (c=c'; c<T_C; c++)
        OFM[m,h,w] += W[m,c] × IFM[c,h,w];
```

— Portion computed in one cycle

FIG. 6

| $W_0$ | $W_1$ | $W_2$ |
|---|---|---|
| $W_3$ | $W_4$ | $W_5$ |
| $W_6$ | $W_7$ | $W_8$ |

| v1 | v2 | v3 | v4 |
|----|----|----|----|
| 1  | 1  | 1  | 1  |
| 0  | 1  | 0  | 1  |
| 0  | 0  | 0  | 0  |
| 1  | 1  | 1  | 0  |

FIG. 11A

NEURAL NETWORK OPERATION METHOD AND APPARATUS WITH MAPPING ORDERS

CROSS-REFERENCE TO RELATED APPLICATIONS

This application claims the benefit under 35 USC § 119(a) of Korean Patent Application No. 10-2021-0025252 filed on Feb. 25, 2021, in the Korean Intellectual Property Office, the entire disclosure of which is incorporated herein by reference for all purposes.

BACKGROUND

1. Field

The following description relates to a neural network operation method and apparatus.

2. Description of Related Art

A neural network accelerator may refer to dedicated hardware for implementing and executing a neural network. In general, a neural network accelerator has multiple cores and is designed to focus on a low-precision operation, new dataflow architecture, or in-memory computing capability.

The accelerator includes processing elements for performing a neural network operation. When a neural network operation is performed using a conventional two-dimensional (2D) processing element array, the utilization of processing elements may decrease due to columns that are discarded as not being added in a channel direction in performing a depthwise convolution operation.

Further, an architecture for multiplications with variable latency has low scalability since it operates well only when the number of multiplier accumulator (MAC) operators is small.

Thus, there is a demand for an accelerator structure having high scalability even in variable latency while improving the utilization of processing elements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation apparatus includes an input register configured to store an input feature map, a processing element array including a processing element configured to perform an operation based on the input feature map and a weight matrix, and a controller configured to map a portion of the input feature map and a portion of the weight matrix, both on which the operation is to be performed, to the processing element.

The processing element may include a multiplexer configured to multiplex the portion of the input feature map, and a shifter configured to shift an output of the multiplexer based on the portion of the weight matrix.

A size of the processing element array may be determined based on a height of an output feature map, a width of the output feature map, and a size of the weight matrix.

The processing element array may include two-dimensional (2D) processing element planes, and a size of the processing element planes may be determined based on the height of the output feature map and the width of the output feature map.

The controller may be further configured to map a first weight included in the weight matrix and a first portion of the input feature map corresponding to the first weight to the processing element, and to map a second weight included in the weight matrix and a second portion of the input feature map corresponding to the second weight to the processing element.

The controller may be further configured to map a weight in the weight matrix and a first portion of the input feature map corresponding to the weight in a channel direction of the input feature map, or to map the weight and the first portion of the input feature map corresponding to the weight in a channel direction of the output feature map.

The controller may be further configured to alternately perform the mapping in the channel direction of the input feature map and the mapping in the channel direction of the output feature map.

The controller may be further configured to reorder the weight matrix based on whether the weight matrix has variable latency.

The controller may be further configured to generate a binary matrix based on whether the weight matrix has variable latency, to reorder the binary matrix based on column elements included in the binary matrix, and to reorder the weight matrix based on the reordered binary matrix.

The neural network operation apparatus may further include an adder tree configured to add an output of the processing element, and an accumulator configured to accumulate an output of the adder tree.

In another general aspect, a neural network operation method includes storing an input feature map, mapping a portion of the input feature map and a portion of a weight matrix to a processing element performing an operation based on the input feature map and the weight matrix, and performing the operation based on the mapped portion of the input feature map and the mapped portion of the weight matrix.

The performing may include multiplexing the portion of the input feature map, and shifting the multiplexed portion of the input feature map based on the portion of the weight matrix.

The processing element may be included in a processing element array, and a size of the processing element array may be determined based on a height of an output feature map, a width of the output feature map, and a size of the weight matrix.

The processing element array may include 2D processing element planes, and a size of the processing element planes may be determined based on the height of the output feature map and the width of the output feature map.

The mapping may include mapping a first weight included in the weight matrix and a first portion of the input feature map corresponding to the first weight to the processing element, and mapping a second weight included in the weight matrix and a second portion of the input feature map corresponding to the second weight to the processing element.

The mapping may include mapping a weight in the weight matrix and a first portion of the input feature map corresponding to the weight in a channel direction of the input feature map, or mapping the weight and the first portion of the input feature map corresponding to the weight in a channel direction of the output feature map.

The mapping of the portion of the input feature map and the portion of the weight matrix may include alternately performing the mapping in the channel direction of the input feature map and the mapping in the channel direction of the output feature map.

The neural network operation method may further include reordering the weight matrix based on whether the weight matrix has variable latency.

The reordering may include generating a binary matrix based on whether the weight matrix has variable latency, reordering the binary matrix based on column elements included in the binary matrix, and reordering the weight matrix based on the reordered binary matrix.

The neural network operation method may further include adding an output of the processing element, and accumulating the added output of the processing element.

Other features and aspects will be apparent from the following detailed description, the drawings, and the claims.

BRIEF DESCRIPTION OF THE DRAWINGS

FIG. 4 illustrates an example of a loop of a depth-wise convolution operation.

FIG. 6 illustrates an example of a loop of a point-wise convolution operation.

FIG. 9A illustrates an example of weights to describe variable latency in a depth-wise convolution operation.

FIG. 11A illustrates an example of a binary matrix generated based on variable latency.

Figure 1:
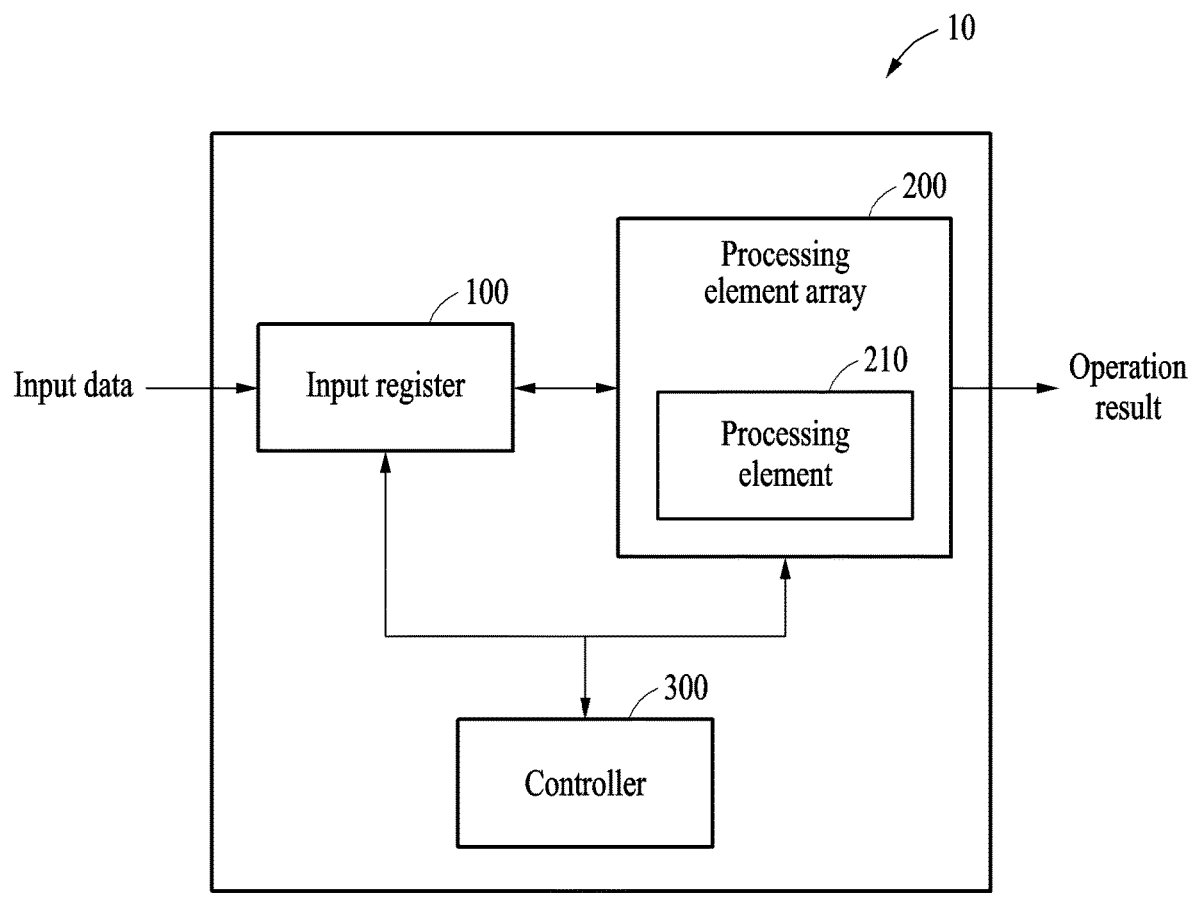
FIG. 1 illustrates an example of a neural network operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 2:
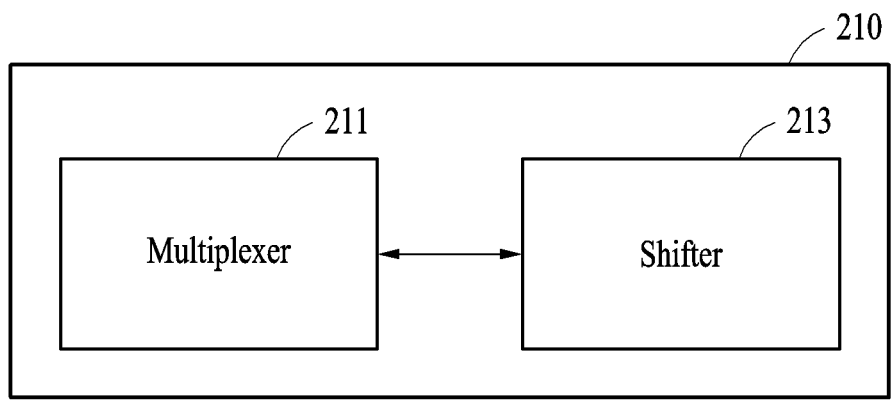
FIG. 2 illustrates an example of a processing element shown in FIG. 1.

FIG. 1 illustrates an example of a neural network operation apparatus, and FIG. 2 illustrates an example of a processing element shown in FIG. 1.

Referring to FIGS. 1 and 2, a neural network operation apparatus 10 may perform a neural network operation. The neural network operation apparatus 10 may generate an operation result by performing a neural network operation based on input data.

The input data may be in the form of an image or a feature map. A feature map may refer to an image that is processed using a filter (or kernel) including weights. The input data may include an input feature map.

The neural network (or an artificial neural network) may include a statistical training algorithm that simulates biological neurons in machine learning and cognitive science. The neural network may refer to a general model that has an ability to solve a problem, where artificial neurons (nodes) forming the network through synaptic combinations change a connection strength of synapses through training.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may include an input register 100, a processing element array 200, and a controller 300. The processing element array 200 may include at least one processing element 210. The processing element 210 may include a multiplexer 211 and a shifter 213.

The neural network operation apparatus 10 may further include an adder tree configured to add an output of the processing element 210 and an accumulator configured to accumulate an output of the adder tree.

The input register 100 may be implemented as a memory. The memory may store instructions (or programs) executable by the processor. For example, the instructions may include instructions to perform an operation of the processor and/or an operation of each element of the processor.

The memory may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

The input register 100 may store the input data on which an operation is to be performed through the processing element array 200. In other words, the input register 100 may store the input feature map.

The size of the processing element array 200 may be determined based on the height of an output feature map, the width of the output feature map, and the size of a weight matrix. The size of the weight matrix may include the row and/or column size of the weight matrix.

The processing element array 200 may include two-dimensional processing element planes. The size of the processing element planes may be determined based on the height of the output feature map and the width of the output feature map.

The processing element 210 may perform an operation based on the input feature map and the weight matrix. The processing element 210 may multiplex the input feature map through the multiplexer 211 and shift values included in the input feature map based on weights through the shifter 213.

The multiplexer 211 may select one of analog or digital signals and transmit the selected input to one line. The multiplexer 211 may multiplex a portion of the input feature map.

The shifter 213 may shift the input. The shifter 213 may shift the input bitwise. The shifter 213 may shift an output of the multiplexer 211 based on a portion of the weight matrix. The shifter 213 may perform a multiplication operation by shifting the portion of the input feature map.

The controller 300 may include a separate processor (not shown). The processor may process data stored in the memory (for example, the input register 100). The processor may execute a computer-readable code (for example, software) stored in the memory and instructions triggered by the processor.

The "processor" may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The controller 300 may map the portion of the input feature map and the portion of the weight matrix, both on which the operation is to be performed, to the processing element 210. The mapping may refer to the process of selecting an operand to go through the operation through the processing element 210 from the input feature map and the weights and applying the selected operand to the processing element 210.

The controller 300 may perform a neural network operation through the mapping of the input feature map and the weight. The controller 300 may perform different types of operations through the selection of a portion of the input feature map and a portion of the weights and the change of the mapping order. For example, the controller 300 may perform a depth-wise convolution operation or a point-wise convolution operation through the mapping of the input feature map and the weights.

The controller 300 may perform the depth-wise convolution operation by mapping a weight and a portion of the input feature map corresponding to the weight to the processing element 210.

The controller 300 may map a first weight included in the weight matrix and a portion of the input feature map corresponding to the first weight to the processing element 210. The controller 300 may map a second weight included in the weight matrix and a portion of the input feature map corresponding to the second weight to the processing element 210.

The process of performing the depth-wise convolution operation by the controller 300 will be described further with reference to FIGS. 4 and 5.

The controller 300 may perform the point-wise convolution operation by controlling the direction in which a weight and a portion of the input feature map corresponding to the weight are mapped. The controller 300 may map a weight in the weight matrix and a portion of the input feature map corresponding to the weight in a channel direction of the input feature map, or map the weight and the portion of the input feature map corresponding to the weight in a channel direction of the output feature map.

In this example, the controller 300 may alternately perform the mapping in the channel direction of the input feature map and the mapping in the channel direction of the output feature map. The process of performing the point-wise convolution operation by the controller 300 will be described further with reference to FIGS. 6 to 8.

The controller 300 may reorder the weight matrix based on whether the weight matrix has variable latency. The controller 300 may generate a binary matrix based on whether the weight matrix has variable latency, and reorder the binary matrix based on column elements included in the binary matrix. The controller 300 may reorder the weights based on the reordered binary matrix. The process of reordering the weights by the controller 300 will be described further with reference to FIGS. 11A to 11D.

Figure 3:
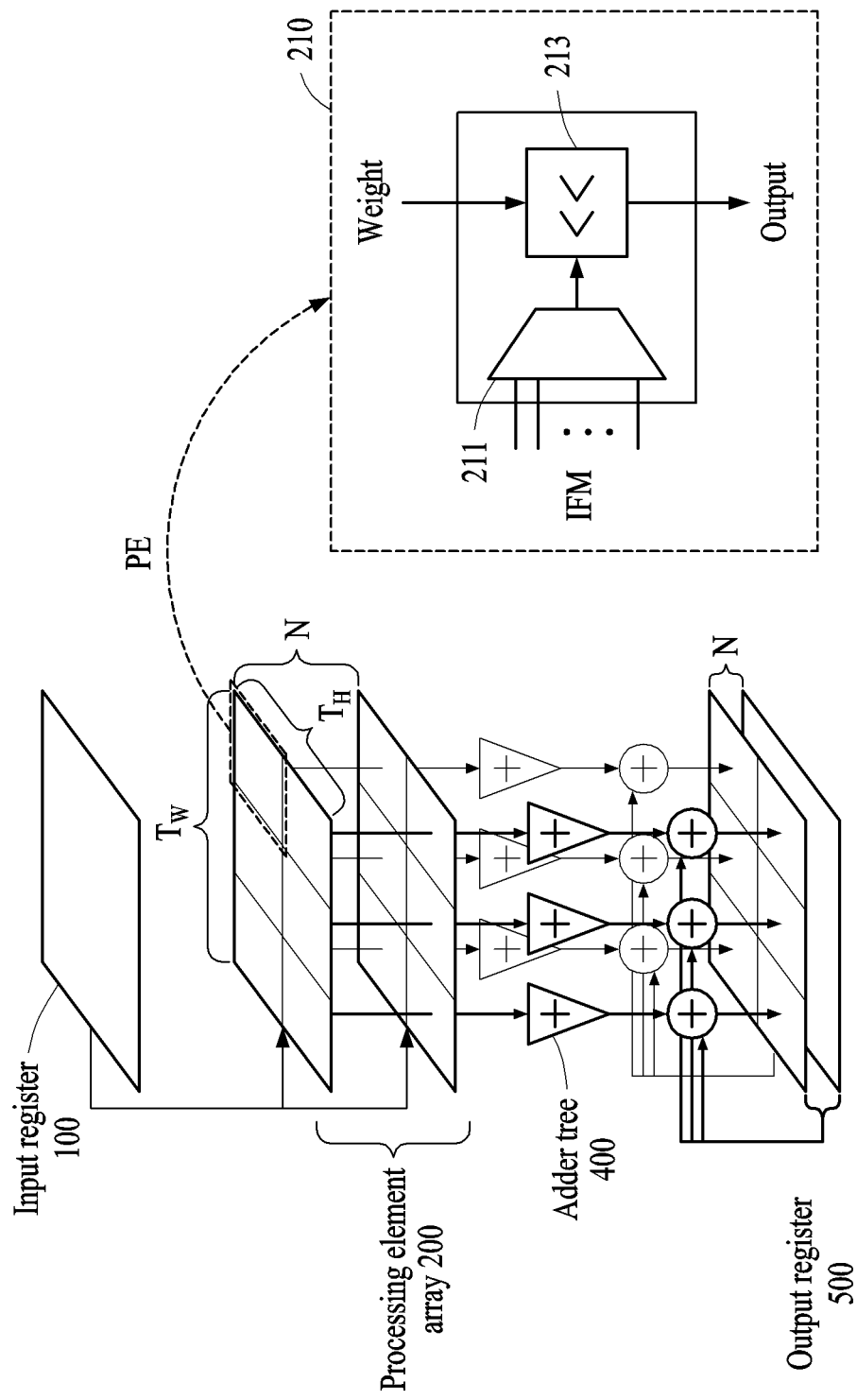
FIG. 3 illustrates an example of a hardware structure of the neural network operation apparatus of FIG. 1.

FIG. 3 illustrates an example of a hardware structure of the neural network operation apparatus of FIG. 1.

Referring to FIG. 3, the neural network operation apparatus 10 may include the input register 100, the processing element array 200, an adder tree 400, and an output register 500.

The input register 100 may be in the form of an array of registers.

The processing element array 200 may include at least one processing element 210, and the processing element 210 may include the multiplexer 211 and the shifter 213.

The processing element array 200 may have a three-dimensional (3D) structure. The processing element array 200 may include processing element planes. A processing element plane may include a two-dimensional (2D) array of processing elements 210.

The processing element array 200 may have a size of $T_W \times T_H \times N$. In this example, a processing element plane may have a size of $T_W \times T_H$. A processing element plane may share a weight.

The multiplexer 211 may transmit a portion of the input feature map from a register included in the input register 100 to the shifter 213. The multiplexer 211 may be configured to support depth-wise convolution and point-wise convolution having various kernel sizes and strides.

When performing a convolution operation, the processing element array 200 may compute a portion of the output feature map having a size of $T_W \times T_H$ for each cycle of the operation.

Hereinafter, the process of performing a depth-wise convolution operation by the neural network operation apparatus 10 will be described in detail with reference to FIGS. 4 and 5.

Figure 5:
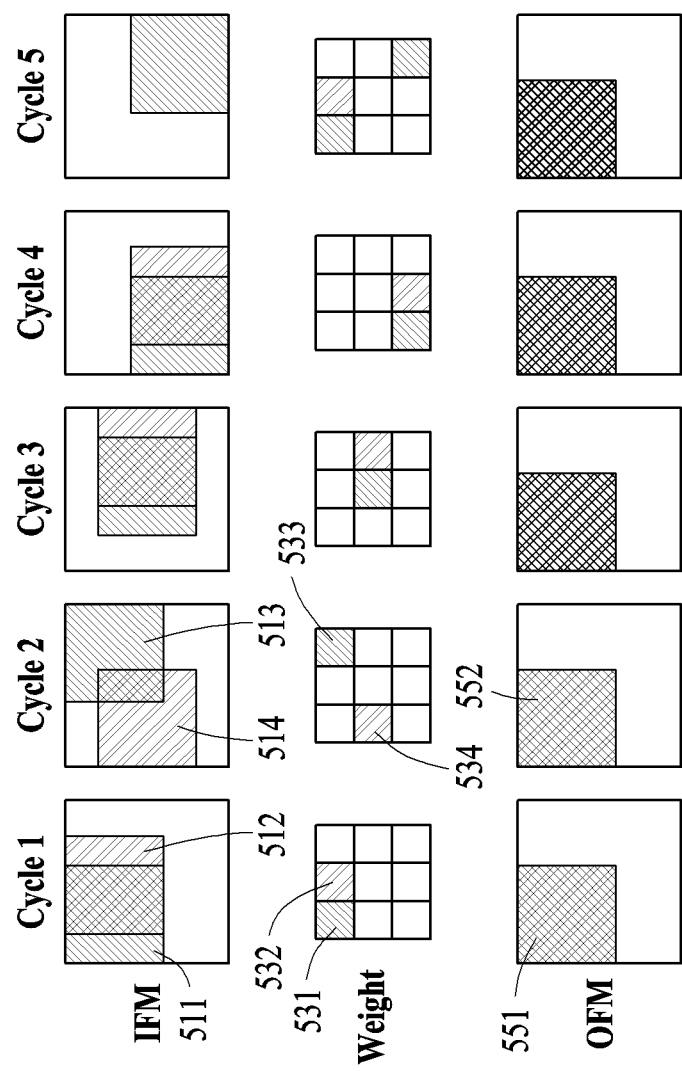
FIG. 5 illustrates an example of performing a depth-wise convolution operation by the neural network operation apparatus of FIG. 1.
Figure 5:
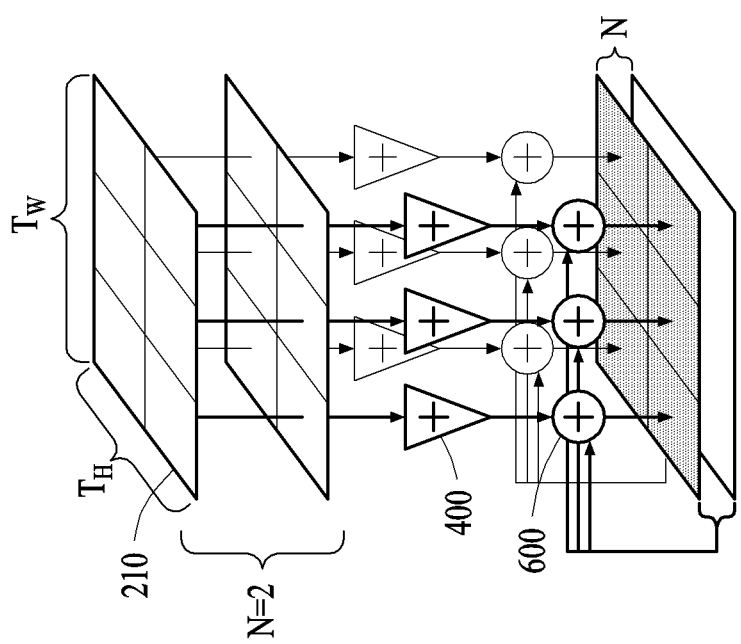

FIG. 4 illustrates an example of a loop of a depth-wise convolution operation, and FIG. 5 illustrates an example of performing the depth-wise convolution operation by the neural network operation apparatus of FIG. 1.

Referring to FIGS. 4 and 5, the controller 300 may perform a depth-wise convolution operation by controlling the mapping of an input feature map and weights to be inputted to the processing element 210.

A general convolution operation may be an operation for performing a convolution between a feature map and a weight matrix. In detail, to perform a convolution operation, the process of producing one element of an output feature map by multiplying and adding an element of the feature map and an element of the weight matrix corresponding thereto may be performed iteratively.

The depth-wise convolution operation may be a convolution operation for performing only a convolution in a space direction, rather than performing a convolution in a channel direction.

The example of FIG. 4 shows an example of a loop structure used for the depth-wise convolution operation. In FIG. 4, a box defined by a broken line may be a portion that is computed in one cycle.

The example of FIG. 5 shows a cycle of performing a depth-wise convolution operation of an input feature map (or a portion of the input feature map) and a weight matrix.

In $T_W \times T_H \times N$, which is the size of the processing element array in performing the depth-wise convolution operation, $T_W$ denotes the width of the processing element, $T_H$ denotes the height of the processing element, and N denotes the number of processing element planes (or the depth of the processing element array).

$T_W$, $T_H$, and N may correspond to the height of the output feature map, the width of the output feature map, and the square of the size of weights (or the size of kernels), respectively. The example of FIG. 5 shows a result of accumulating the output feature map corresponding to a size of $T_W \times T_H$ for five cycles if K, the size of weights, is "3". In this example, the operation cycles may be determined as expressed by $\lceil K^2/N \rceil$.

In Cycle 1, the controller 300 may map a first weight 531 included in a weight matrix and a portion 511 of an input feature map corresponding to the first weight 531 to the processing element 210. Further, the controller 300 may map a second weight 532 included in the weight matrix and a portion 512 of the input feature map corresponding to the second weight 532 to the processing element 210.

The processing element 210 may perform a multiplication between the first weight 531 and the portion 511 of the input feature map by shifting the mapped portion 511 of the input feature map based on the first weight 531. Likewise, the processing element 210 may perform a multiplication between the second weight 532 and the portion 512 of the input feature map by shifting the mapped portion 512 of the input feature map based on the second weight 532.

Thereafter, the adder tree 400 may add the multiplication results, and an accumulator 600 may accumulate the added multiplication results to output an output feature map 551.

In Cycle 2, the controller 300 may map a third weight 533 included in the weight matrix and a portion 513 of the input feature map corresponding to the third weight 533 to the processing element 210. Further, the controller 300 may map a fourth weight 534 included in the weight matrix and a portion 514 of the input feature map corresponding to the fourth weight 534 to the processing element 210.

The processing element 210 may perform a multiplication between the third weight 533 and the portion 513 of the input feature map by shifting the mapped portion 513 of the input feature map based on the third weight 533. Likewise, the processing element 210 may perform a multiplication between the fourth weight 534 and the portion 514 of the input feature map by shifting the mapped portion 514 of the input feature map based on the fourth weight 534.

Thereafter, the adder tree 400 may add the multiplication results, and the accumulator 600 may accumulate the added multiplication results to output an output feature map 552.

In Cycles 3 to 5, operations may be performed in the same manner as in Cycles 1 and 2 described above.

Hereinafter, the process of performing a point-wise convolution operation by the neural network operation apparatus 10 will be described in detail with reference to FIGS. 6 to 8.

Figure 7A:
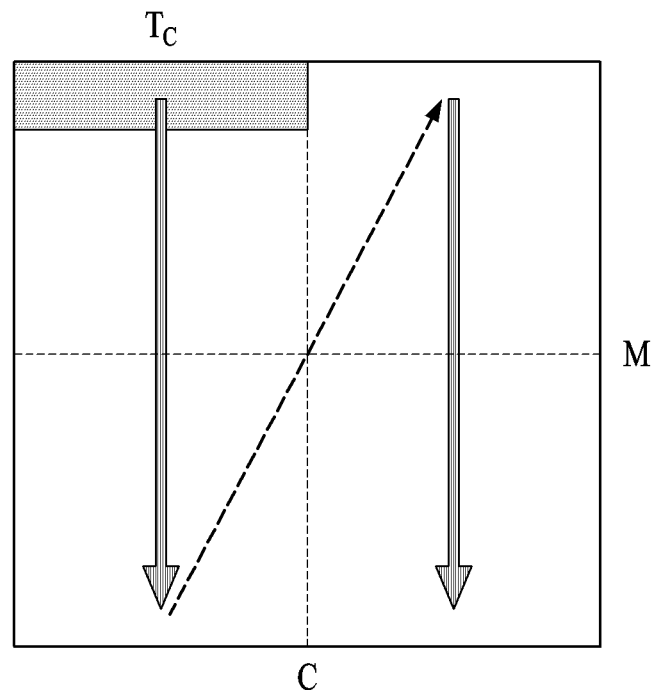
FIG. 7A illustrates an example of a weight mapping scheme of a point-wise convolution operation.
Figure 7B:
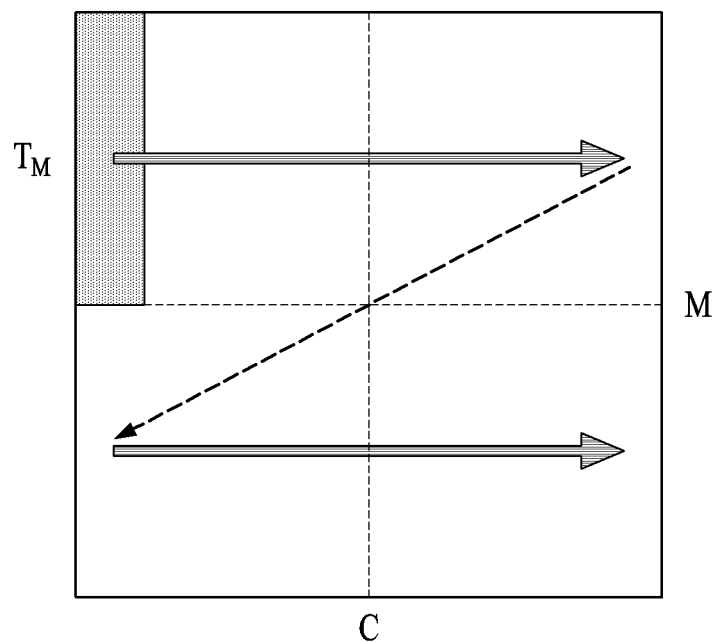
FIG. 7B illustrates an example of a weight mapping scheme of a point-wise convolution operation.
Figure 7C:
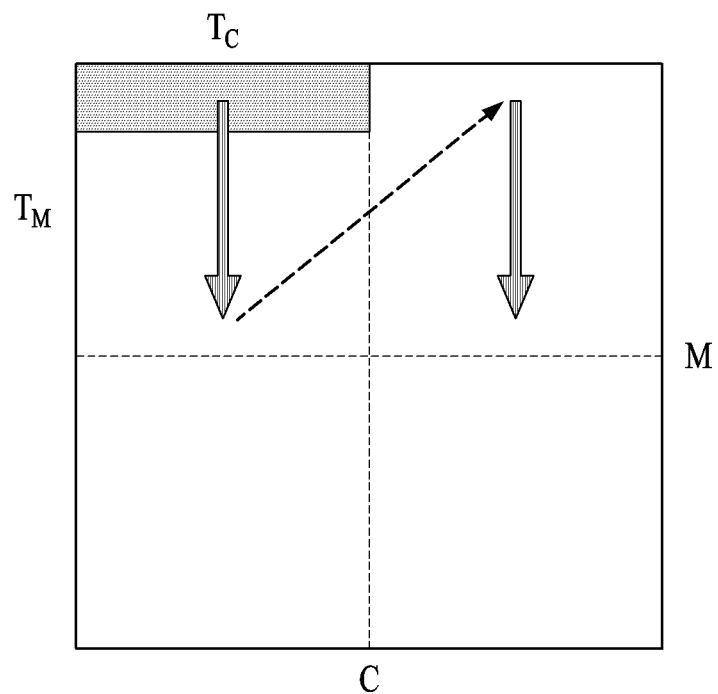
FIG. 7C illustrates an example of a weight mapping scheme of a point-wise convolution operation.
Figure 8:
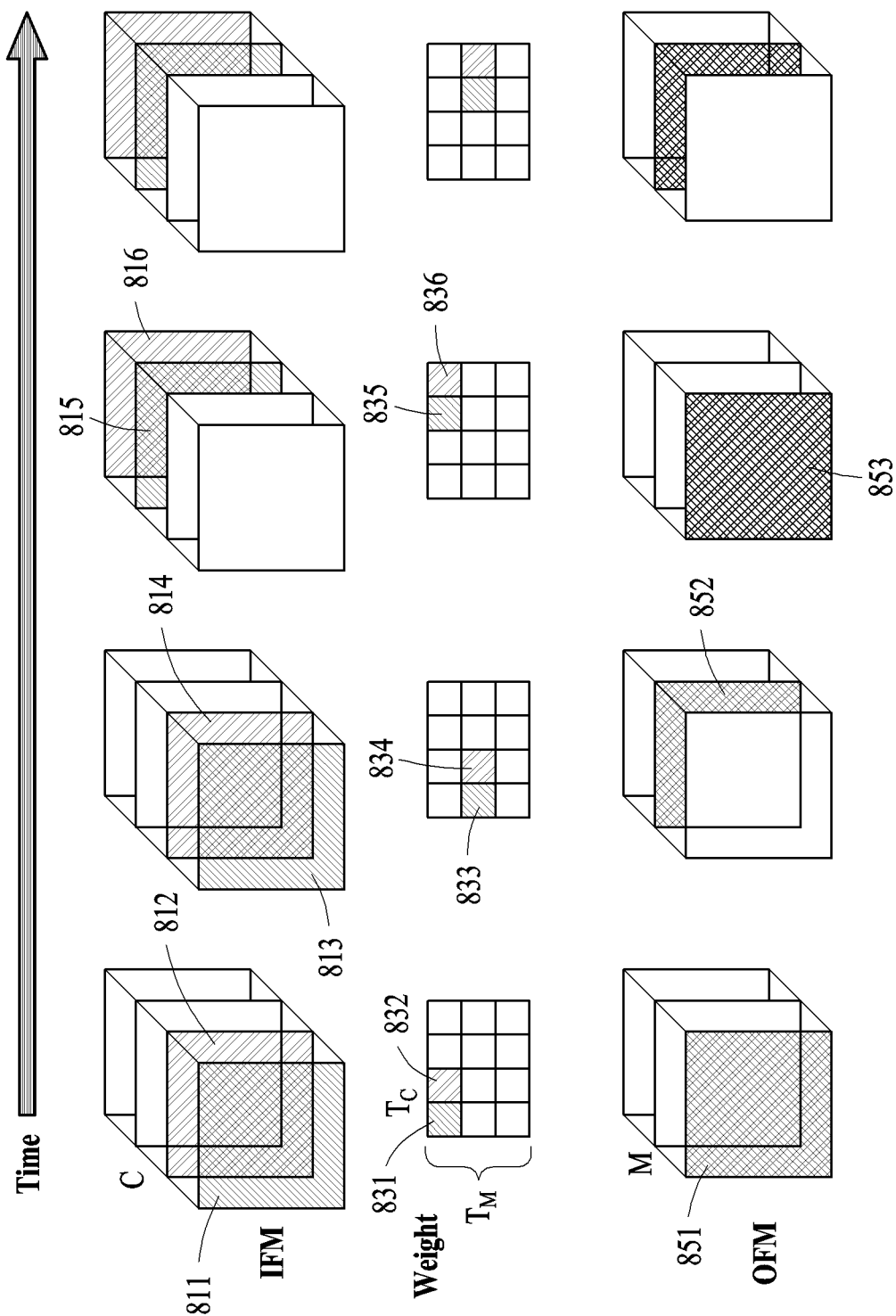
FIG. 8 illustrates an example of performing a point-wise convolution operation by the neural network operation apparatus of FIG. 1.

FIG. 6 illustrates an example of a loop of a point-wise convolution operation, FIGS. 7A to 7C illustrate examples of weight mapping schemes of a point-wise convolution operation, and FIG. 8 illustrates an example of performing the point-wise convolution operation by the neural network operation apparatus of FIG. 1.

Referring to FIGS. 6 to 8, the controller 300 may perform a point-wise convolution operation by controlling the mapping of an input feature map and weights to be inputted to the processing element 210.

The point-wise convolution operation may be a convolution operation for performing only a convolution in a channel direction without performing a convolution in a space direction.

The example of FIG. 6 shows an example of a loop structure used for the point-wise convolution operation. In FIG. 6, a box defined by a broken line may be a portion that is computed in one cycle.

To perform the point-wise convolution operation, the size of the array of the input register 100 may be $T_W \times T_H \times N$, and the size of the output register 500 may also be $T_W \times T_H \times N$. The operation of a cycle $\lceil C/N \rceil$ may be performed to generate an output feature map having a size of $T_W \times T_H \times N$.

The controller 300 may map the input feature map and the weights in various manners to perform the point-wise convolution operation. The controller 300 may map a weight in the weight matrix and a portion of the input feature map corresponding to the weight in a channel direction of the input feature map, or map the weight and the portion of the input feature map corresponding to the weight in a channel direction of the output feature map.

FIGS. 7A to 7C show examples of the directions in which the input feature map and the weights are mapped. Here, M denotes the channel direction of the output feature map, and C denotes the channel direction of the input feature map.

FIG. 7A shows a scheme of mapping the input feature map and the weights in the channel direction of the input feature map. In the example of FIG. 7A, the size of the input feature map used to process N channel-wise weights may be $T_W \times T_H \times N$.

The final output feature map may be generated by adding output results of processing elements at the same position on the respective processing element planes. In this example, the size of the output feature map may be $T_W \times T_H$. In the example of FIG. 7A, a different input feature map may be used for each operation cycle.

FIG. 7B shows a scheme of mapping the input feature map and the weights in the channel direction of the output feature map. In the example of FIG. 7B, the size of the input feature map used to process N weights in the channel direction of the output feature map may be $T_W \times T_H$.

The elements of the output feature map may be computed by respective processing elements 210 of the processing element array 200, and the size of the output feature map may be $T_W \times T_H \times N$. The mapping scheme of FIG. 7B may use a data path different from that used for a depth-wise convolution operation.

FIG. 7C shows an example of performing mapping using a combination of the channel direction of the input feature map and the channel direction of the output feature map. In this example, the size of the input feature map used to process N weights in the channel direction of the output feature map may be $T_W \times T_H \times N$, and the elements of the output feature map may be computed by the respective processing element 210 of the processing element array 200.

The size of the output feature map corresponding to one cycle may be $T_W \times T_H$. In the mapping scheme as shown in FIG. 7C, the input feature map may be reused for cycles.

The example of FIG. 8 shows the process of performing a point-wise convolution operation when mapping is performed in the scheme of FIG. 7C. The controller 300 may alternately perform the mapping in the channel direction of the input feature map and the mapping in the channel direction of the output feature map.

The controller 300 may map a first weight 831 of a weight matrix and a first channel 811 of an input feature map corresponding to the first weight 831 to the processing element 210, thereby shifting the first channel 811 based on the first weight 831. The processing element 210 may perform a multiplication of the first weight 831 and the first channel 811 by shifting the first channel 811.

The controller 300 may map a second weight 832 of the weight matrix and a second channel 812 of the input feature map corresponding to the second weight 832 to the processing element 210, thereby shifting the second channel 812 based on the second weight 832. The processing element 210 may perform a multiplication of the second weight 832 and the second channel 812 by shifting the second channel 812.

The multiplication results may be added, and the added multiplication results may be accumulated to output an output feature map 851.

Thereafter, the controller 300 may map a portion of the input feature map and a weight corresponding to a subsequent channel direction of the output feature map. In detail, the controller 300 may map a third weight 833 of the weight matrix and a first channel 813 of the input feature map corresponding to the third weight 833 to the processing element 210, thereby shifting the first channel 813 based on the third weight 833. The processing element 210 may perform a multiplication of the third weight 833 and the first channel 813 by shifting the first channel 813.

Further, the controller 300 may map a fourth weight 834 of the weight matrix and a second channel 814 of the input feature map corresponding to the fourth weight 834 to the processing element 210, thereby shifting the second channel 814 based on the fourth weight 834. The processing element 210 may perform a multiplication of the fourth weight 834 and the second channel 814 by shifting the second channel 814.

The multiplication results may be added, and the added multiplication results may be accumulated to output an output feature map 852.

Thereafter, the controller 300 may map a portion of the input feature map and a weight corresponding to a subsequent channel direction of the input feature map. In detail, the controller 300 may map a fifth weight 835 of the weight matrix and a third channel 815 of the input feature map corresponding to the fifth weight 835 to the processing element 210, thereby shifting the third channel 815 based on the fifth weight 835. The processing element 210 may perform a multiplication of the fifth weight 835 and the third channel 815 by shifting the third channel 815.

Further, the controller 300 may map a sixth weight 836 of the weight matrix and a fourth channel 816 of the input feature map corresponding to the sixth weight 835 to the processing element 210, thereby shifting the fourth channel 816 based on the sixth weight 836. The processing element 210 may perform a multiplication of the sixth weight 836 and the fourth channel 816 by shifting the fourth channel 816.

The multiplication results may be added, and the added multiplication results may be accumulated to output an output feature map 853.

Figure 9A:
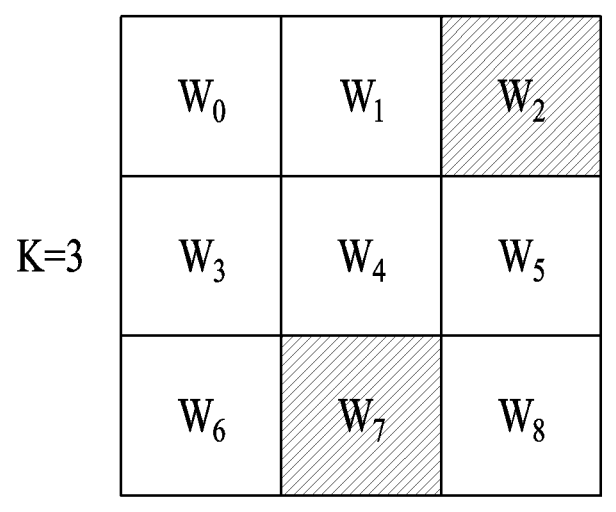
Figure 9B:
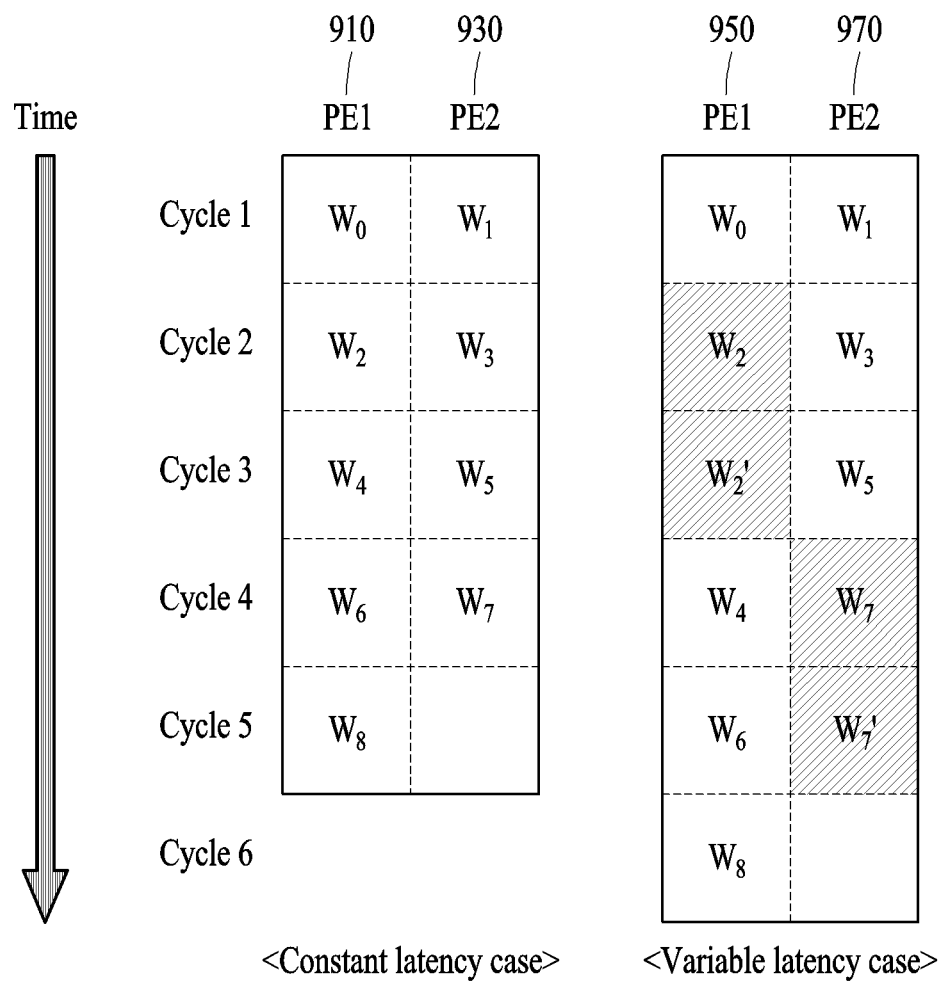
FIG. 9B illustrates an example of an order in which the weights of FIG. 9A are processed by processing elements over time.

FIG. 9A illustrates an example of weights to describe variable latency in a depth-wise convolution operation, and FIG. 9B illustrates an example of an order in which the weights of FIG. 9A are processed by processing elements over time.

Figure 10A:
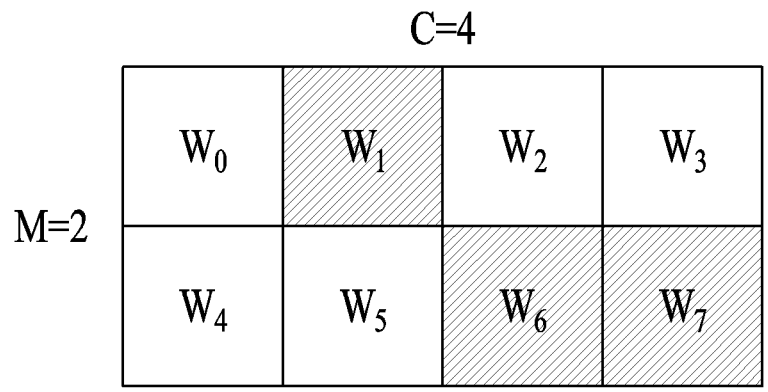
FIG. 10A illustrates an example of weights to describe variable latency in a point-wise convolution operation.
Figure 10B:
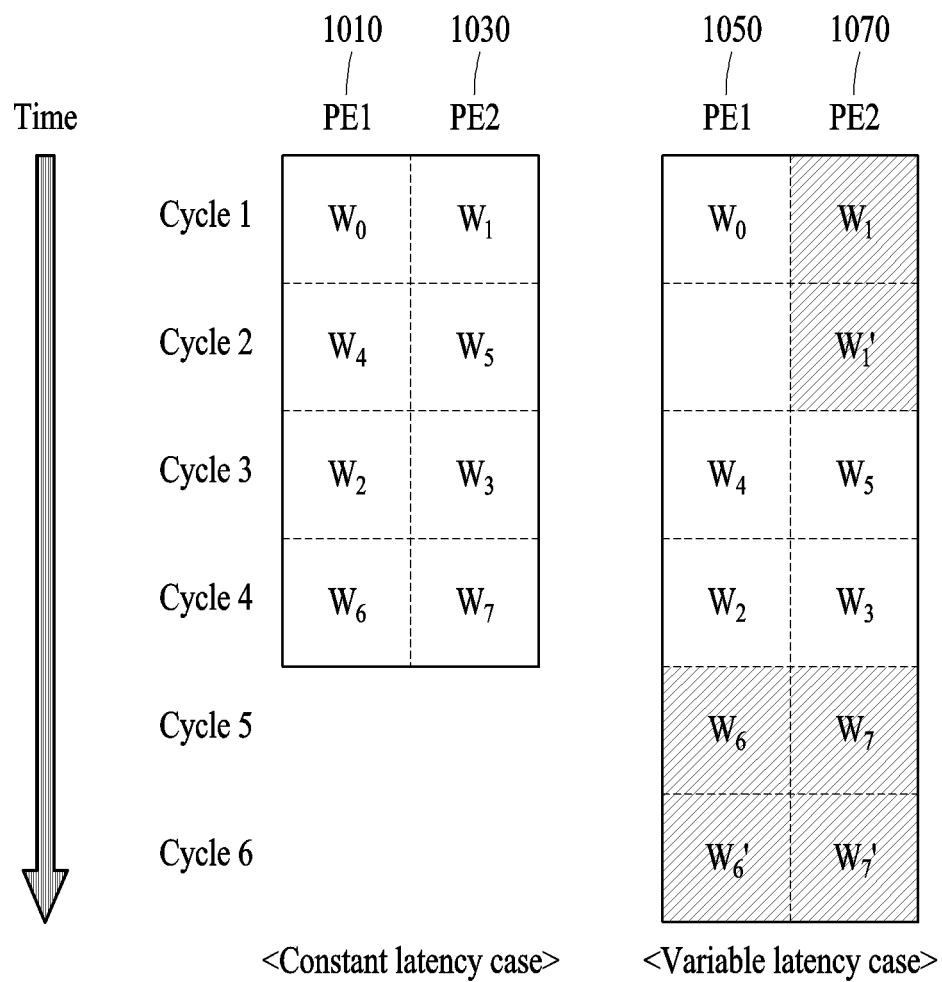
FIG. 10B illustrates an example of an order in which the weights of FIG. 10A are processed by processing elements over time.

FIG. 10A illustrates an example of weights to describe variable latency in a point-wise convolution operation, and FIG. 10B illustrates an example of an order in which the weights of FIG. 10A are processed by processing elements over time.

Referring to FIGS. 9A to 10B, the neural network operation apparatus 10 may perform a variable cycle multiplication. The neural network operation apparatus 10 may prevent performance degradation caused by the variable cycle multiplication.

When a variable cycle multiplication is performed, a configuration including a different number of words may be achieved for each weight. The neural network operation apparatus 10 may efficiently process weights having various latencies or various numbers of words. The neural network operation apparatus 10 may reduce the effect of variable latency by sharing one weight among as many processing elements 210 as possible.

The neural network operation apparatus 10 may have a constant latency case and a variable latency case according to weights. FIGS. 9A and 9B show variable latency in a depth-wise convolution operation.

In the depth-wise convolution operation, processing element planes may not be synchronized with each other. FIGS. 9A and 9B show an example in which N denoting the number of processing element planes is "2", and K denoting the size of weights (or kernels) is "3".

In the example of FIG. 9B, in a constant latency case, a processing element plane 910 may process weights $W_0$, $W_2$, $W_4$, $W_6$, and $W_8$, and a processing element plane 930 may process weights $W_1$, $W_3$, $W_5$, and $W_7$. That is, in the constant latency case, the processing element planes 910 and 930 may process their respective weights in time order.

In the variable latency case (or when the weights have variable latency), a processing element plane may perform the operation using an additional cycle. In this case, when an operation by a last processing element plane ends, the computation of an output feature map having a size of $T_W \times T_H$ may be completed.

When the weights $W_2$ and $W_7$ have variable latency, a processing element 950 may process $W_0$, $W_2$, $W_2'$, $W_4$, $W_6$, and $W_8$ according to a cycle order, and a processing element 970 may process $W_1$, $W_3$, $W_5$, $W_7$, and $W_7'$ in time order.

FIGS. 10A and 10B show variable latency in a point-wise convolution operation. The example of FIG. 10B shows weights processed in each cycle when weights with M being "2" and C being "4" are processed using a processing element array 200 with N being "2", where N denotes the number of processing element planes.

In a constant latency case, a processing element plane 1010 may process weights $W_0$, $W_2$, $W_4$, and $W_6$, and a processing element plane 1030 may process weights $W_1$, $W_3$, $W_5$, and $W_7$. That is, in the constant latency case, the processing element planes 1010 and 1030 may process their respective weights in time order.

In the variable latency case (or when the weights have variable latency), a processing element plane may perform the operation using an additional cycle. In this case, when an operation by a last processing element plane ends, the computation of an output feature map having a size of $T_W \times T_H$ may be completed.

When the weights $W_1$, $W_6$, and $W_7$ have variable latency, a processing element 1050 may process $W_0$, $W_4$, $W_2$, $W_6$, and $W_6'$ according to a cycle order, and a processing element 1070 may process $W_1$, $W_1'$, $W_5$, $W_3$, $W_7$, and $W_T$ in time order.

That is, due to the constraints of the array of the input register 100 and the array of the output register 500, the entire operation cycle may extend as in the variable latency case if there are weights having variable latency among weights computed in one cycle.

Figure 11A:
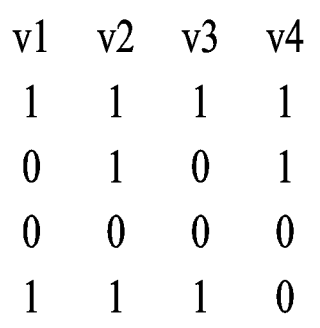
Figure 11B:
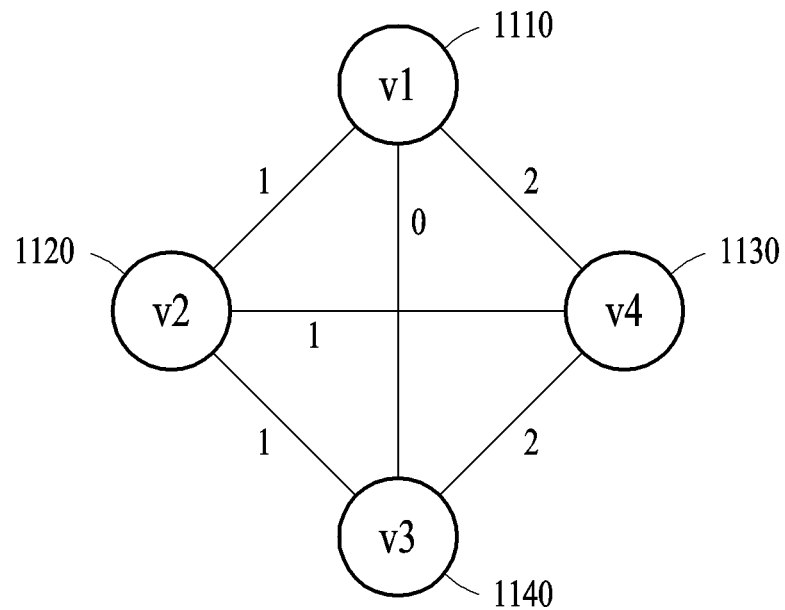
FIG. 11B illustrates an example of a graph generated based on the binary matrix of FIG. 11A.

FIG. 11A illustrates an example of a binary matrix generated based on variable latency, and FIG. 11B illustrates an example of a graph generated based on the binary matrix of FIG. 11A.

Figure 11C:
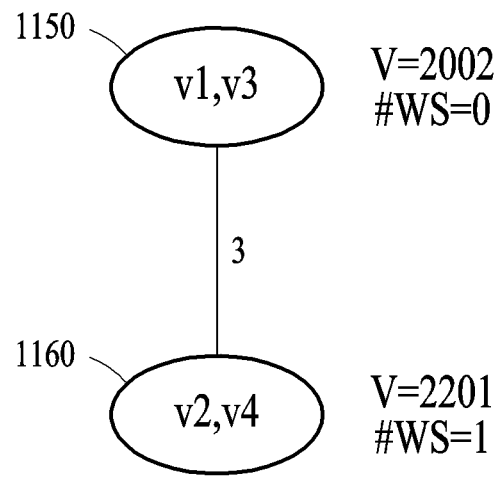
FIG. 11C illustrates an example of a result of reducing the graph of FIG. 11B.
Figure 11D:
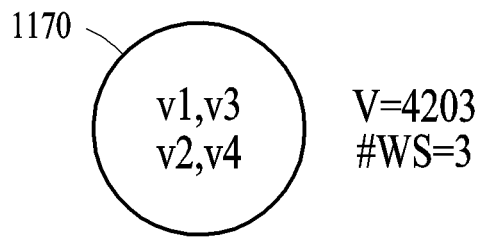
FIG. 11D illustrates an example of a result of reducing the graph of FIG. 11C.

FIG. 11C illustrates an example of a result of reducing the graph of FIG. 11B, and FIG. 11D illustrates an example of a result of reducing the graph of FIG. 11C.

Referring to FIGS. 11A to 11D, the controller 300 may reorder the weight matrix based on whether the weight matrix has variable latency. In this example, the weight matrix may be reordered through a separate processor configured to execute optimization software.

The controller 300 may generate a binary matrix based on whether the weight matrix has variable latency, and reorder the binary matrix based on column elements included in the binary matrix. The controller 300 may reorder the weights based on the reordered binary matrix.

The controller 300 may generate the binary matrix using a size of N×1 that is computed at a time. In this example, N may be a constant determined according to hardware configured to perform a neural network operation.

For example, the binary matrix may be generated by the separate processor configured to execute optimization software by truncating an M×C weight matrix of a point-wise convolution by a size of N×1. FIG. 11A shows an example in which the size of the truncated binary matrix is 4×1.

The controller 300 may reorder the weight matrix, thereby preventing the entire cycle from being delayed when weights have variable latency as in the variable latency case of FIG. 10B.

In the binary matrix of FIG. 11A, columns v1, v2, v3, and v4 may correspond to columns of the weight matrix.

The controller 100 may generate a graph based on the binary matrix. In the example of FIG. 11A, the binary matrix may have four columns. The controller 300 may generate the graph of FIG. 11B by indicating the columns as nodes 1110, 1120, 1130, and 1140 and indicating the number of slots discarded between columns as an edge.

For example, since the columns v1 and v2 are the same in the first, third, and fourth elements and different in the second element, "1" may be indicated on the edge therebetween. In the same manner, the edges may be indicated by calculating discarded slots for all combinations of columns.

Thereafter, the controller 300 may merge nodes having the smallest numbers of discarded slots into one group. For example, since the edge between v1 and v3 is "0" meaning no slots are discarded, the controller 300 may merge v1 and v3 and merge v2 and v4.

In this example, the node 1150 into which v1 and v3 are merged may have a value V of "2002" obtained by adding their elements. Likewise, the node 1160 into which v2 and v4 are merged may have a value V of "2201" obtained by adding their elements. In this example, since the number of slots discarded between "2002" and "2201" is "3", the controller 300 may indicate "3" on the edge.

The controller 300 may iteratively merge nodes until one node remains. If only one node 1170 remains as shown in FIG. 11D, the controller 300 may reorder the weight matrix in the same order as the columns represented in the remaining node.

For example, if the one node 1170 that remains last is reordered in the order of v1, v3, v2, and v4, as shown in the example of FIG. 11D, the controller 300 may reorder the weight matrix in the order of a column of the weight matrix corresponding to v1, a column of the weight matrix corresponding to v3, a column of the weight matrix corresponding to v2, and a column of the weight matrix corresponding to v4.

Figure 12:
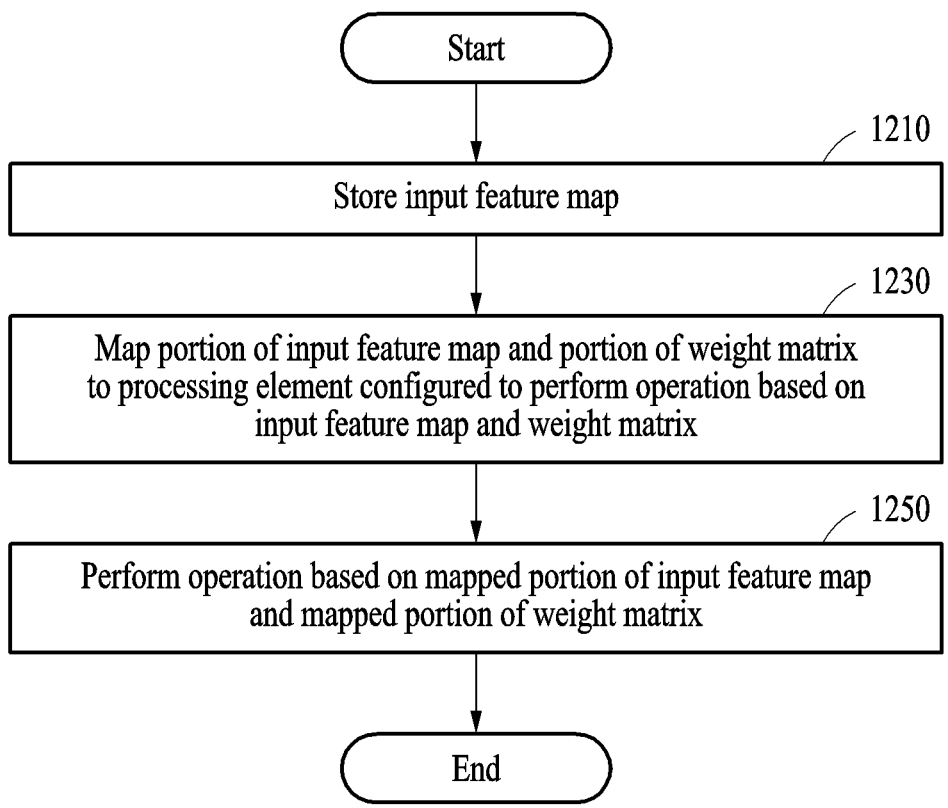
FIG. 12 illustrates an example of a flow of operation of the neural network operation apparatus of FIG. 1.

FIG. 12 illustrates an example of a flow of operation of the neural network operation apparatus of FIG. 1.

Referring to FIG. 12, in operation 1210, the input register 100 may store an input feature map.

In operation 1230, the controller 300 may map a portion of the input feature map and a portion of a weight matrix to the processing element 210 configured to perform an operation based on the input feature map and the weight matrix.

The controller 300 may map a first weight included in the weight matrix and a portion of the input feature map corresponding to the first weight to the processing element 210. The controller 300 may map a second weight included in the weight matrix and a portion of the input feature map corresponding to the second weight to the processing element 210.

The controller 300 may map a weight in the weight matrix and a portion of the input feature map corresponding to the weight in a channel direction of the input feature map, or map the weight and the portion of the input feature map corresponding to the weight in a channel direction of the output feature map.

The controller 300 may alternately perform the mapping in the channel direction of the input feature map and the mapping in the channel direction of the output feature map.

In operation 1250, the processing element 210 may perform the operation based on the mapped portion of the input feature map and the mapped portion of the weight matrix.

The processing element 210 may multiplex the portion of the input feature map, and shift the multiplexed portion of the input feature map based on the portion of the weight matrix.

The processing element 210 may be included in the processing element array 200, and the size of the processing element array 200 may be determined based on the height of an output feature map, the width of the output feature map, and the size of the weight matrix.

The processing element array 200 may include 2D processing element planes, and the size of the processing element planes may be determined based on the height of the output feature map and the width of the output feature map.

The controller 300 may reorder the weight matrix based on whether the weight matrix has variable latency. The controller 300 may generate a binary matrix based on whether the weight matrix has variable latency, and reorder the binary matrix based on column elements included in the binary matrix. The controller 300 may reorder the weights based on the reordered binary matrix.

The adder tree 400 may add an output of the processing element 210, and the accumulator 600 may accumulate the added output of the processing element 210.

The apparatuses, units, modules, devices, and other components described herein are implemented by hardware components. For example, the neural network operation apparatus 10, the input register 100, the processing element array 200, the processing element 210, the multiplexer 211, the shifter 213, the controller 300, the adder tree 400, the output register 500, and the accumulator 600 may all be implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control one or more processors or computers to implement the hardware components and perform the methods as described above are written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing software, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network operation apparatus, comprising:
    an input register configured to store an input feature map;
    a processing element array comprising a processing element configured to perform an operation based on the input feature map and a weight matrix; and
    a controller configured to map a portion of the input feature map and a portion of the weight matrix, both on which the operation is to be performed, to the processing element,
    wherein a size of the processing element array is determined based on a height of an output feature map, a width of the output feature map, and a size of the weight matrix.

2. The neural network operation apparatus of claim 1, wherein the processing element comprises:
    a multiplexer configured to multiplex the portion of the input feature map; and
    a shifter configured to shift an output of the multiplexer based on the portion of the weight matrix.

3. The neural network operation apparatus of claim 1, wherein the processing element array comprises two-dimensional (2D) processing element planes, and
    a size of each of the processing element planes is determined based on the height of the output feature map and the width of the output feature map.

4. The neural network operation apparatus of claim 1, wherein the controller is configured to:
  map a first weight included in the weight matrix and a first portion of the input feature map corresponding to the first weight to the processing element, and
  map a second weight included in the weight matrix and a second portion of the input feature map corresponding to the second weight to the processing element.

5. The neural network operation apparatus of claim 1, wherein the controller is configured to:
  map a first weight in the weight matrix and a first portion of the input feature map corresponding to the first weight in a channel direction of the input feature map; and
  map a second weight and a second portion of the input feature map corresponding to the second weight in a channel direction of an output feature map.

6. The neural network operation apparatus of claim 5, wherein the controller is configured to alternately perform the mapping in the channel direction of the input feature map and the mapping in the channel direction of the output feature map.

7. The neural network operation apparatus of claim 1, wherein the controller is configured to reorder the weight matrix based on whether the weight matrix has variable latency.

8. The neural network operation apparatus of claim 7, wherein the controller is configured to:
  generate a binary matrix based on whether the weight matrix has variable latency,
  reorder the binary matrix based on column elements included in the binary matrix, and
  reorder the weight matrix based on the reordered binary matrix.

9. The neural network operation apparatus of claim 1, further comprising:
  an adder tree configured to add an output of the processing element; and
  an accumulator configured to accumulate an output of the adder tree.

10. A neural network operation method, comprising:
  storing an input feature map;
  mapping a portion of the input feature map and a portion of a weight matrix to a processing element performing an operation based on the input feature map and the weight matrix; and
  performing the operation based on the mapped portion of the input feature map and the mapped portion of the weight matrix,
  wherein the processing element is included in a processing element array, and
  a size of the processing element array is determined based on a height of an output feature map, a width of the output feature map, and a size of the weight matrix.

11. The neural network operation method of claim 10, wherein the performing comprises:
  multiplexing the portion of the input feature map; and
  shifting the multiplexed portion of the input feature map based on the portion of the weight matrix.

12. The neural network operation method of claim 10, wherein the processing element array comprises two-dimensional (2D) processing element planes, and
  a size of each of the processing element planes is determined based on the height of the output feature map and the width of the output feature map.

13. The neural network operation method of claim 10, wherein the mapping comprises:
  mapping a first weight included in the weight matrix and a first portion of the input feature map corresponding to the first weight to the processing element; and
  mapping a second weight included in the weight matrix and a second portion of the input feature map corresponding to the second weight to the processing element.

14. The neural network operation method of claim 10, wherein the mapping comprises:
  mapping a first weight in the weight matrix and a first portion of the input feature map corresponding to the first weight in a channel direction of the input feature map; and
  mapping a second weight and a second portion of the input feature map corresponding to the second weight in a channel direction of an output feature map.

15. The neural network operation method of claim 14, wherein the mapping of comprises alternately performing the mapping in the channel direction of the input feature map and the mapping in the channel direction of the output feature map.

16. The neural network operation method of claim 10, further comprising:
  reordering the weight matrix based on whether the weight matrix has variable latency.

17. The neural network operation method of claim 16, wherein reordering the weight matrix comprises:
  generating a binary matrix based on whether the weight matrix has variable latency;
  reordering the binary matrix based on column elements included in the binary matrix; and
  reordering the weight matrix based on the reordered binary matrix.

18. The neural network operation method of claim 10, further comprising:
  adding an output of the processing element; and
  accumulating the added output of the processing element.

* * * * *